G. W. MAXWELL.
TRACTOR.
APPLICATION FILED JAN. 7, 1918.
1,294,819.
Patented Feb. 18, 1919.
6 SHEETS—SHEET 1.
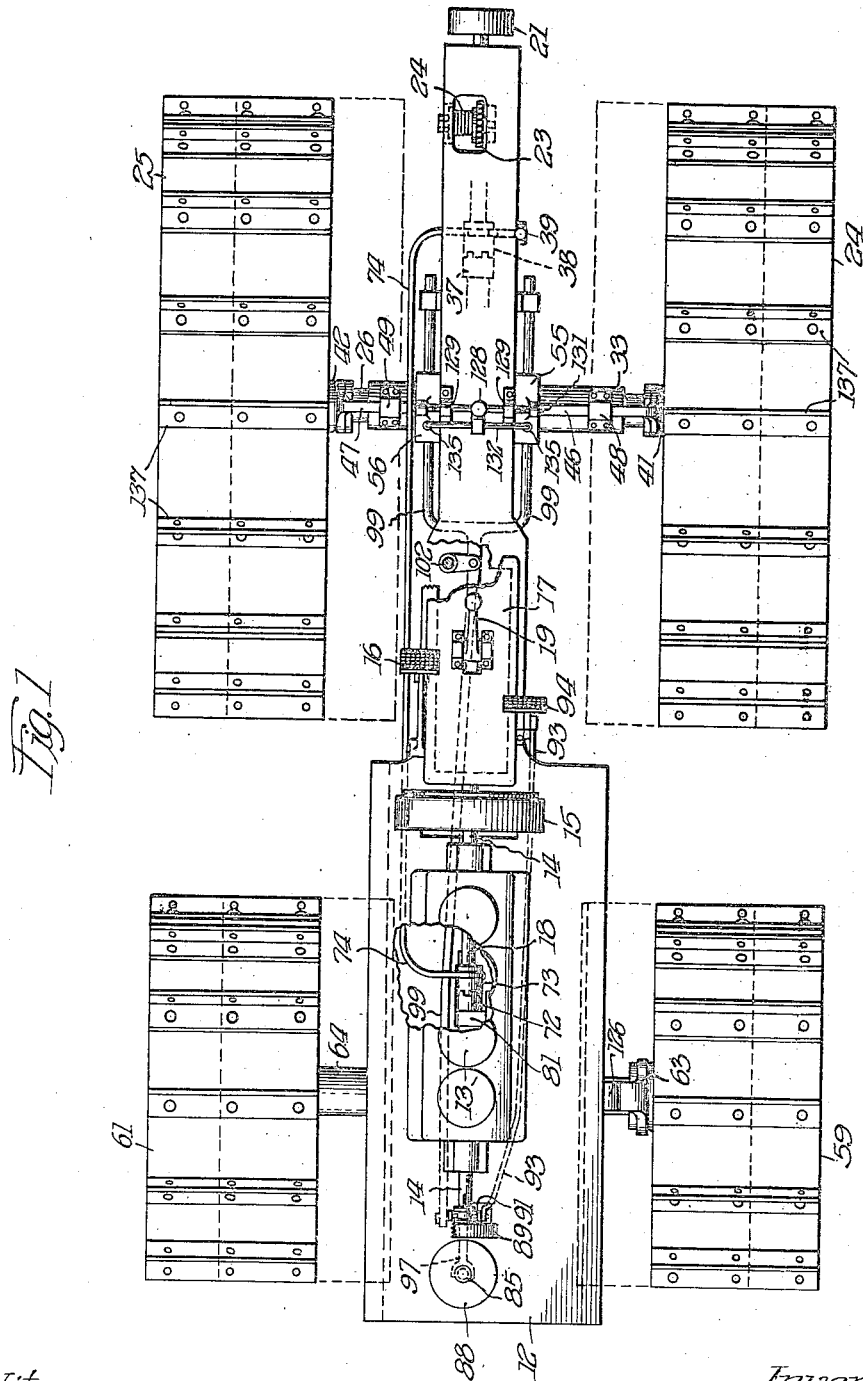
Witness:
Leonard W. Novander
Inventor
George W. Maxwell
By Pondelbilow
Attys

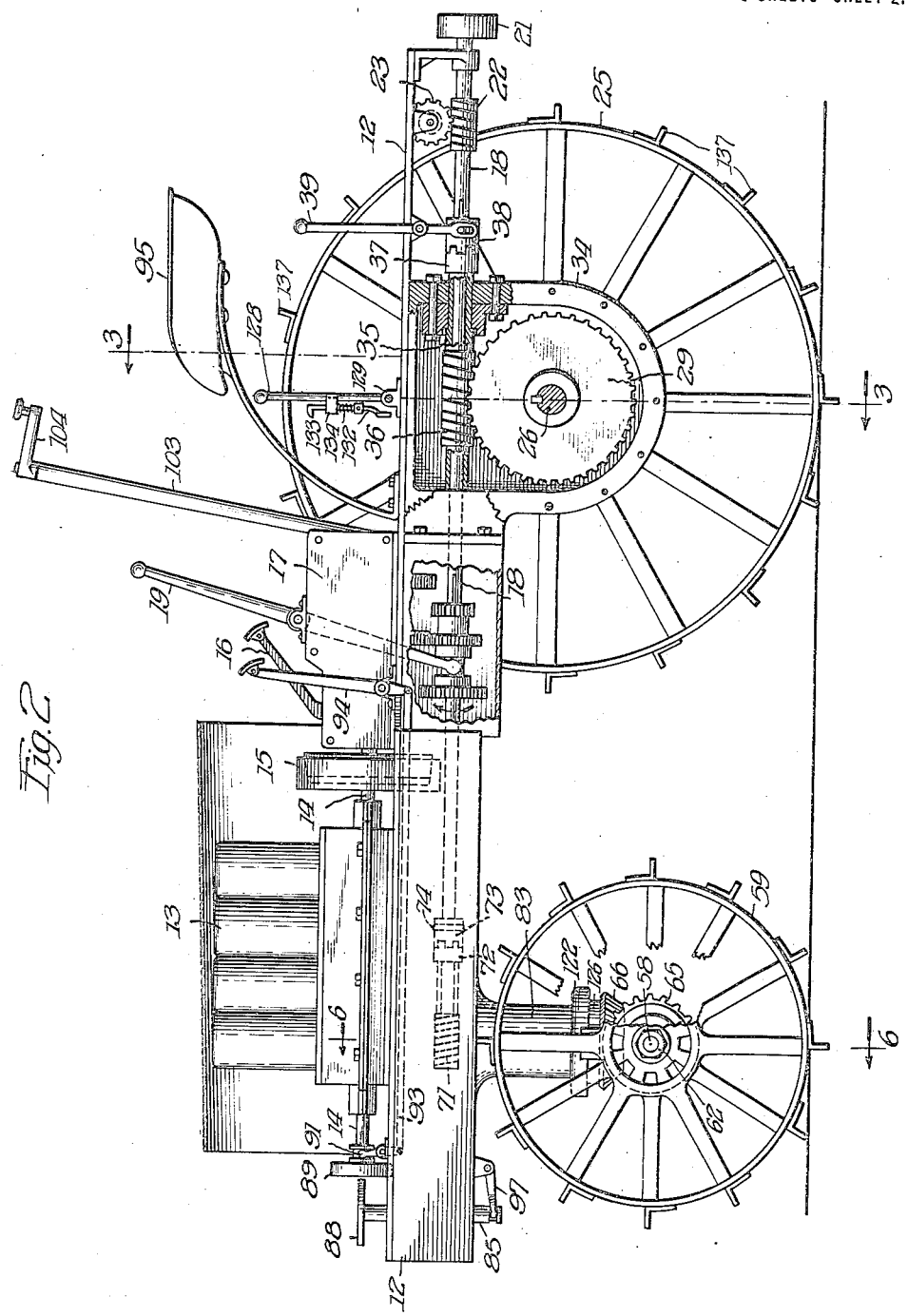

G. W. MAXWELL.
TRACTOR.
APPLICATION FILED JAN. 7, 1918.
1,294,819.
Patented Feb. 18, 1919.
6 SHEETS—SHEET 3.
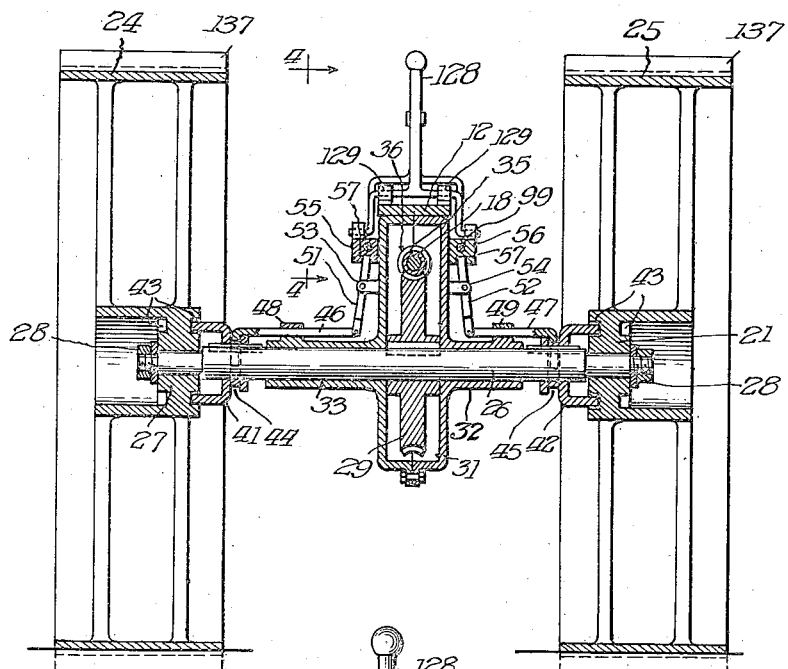
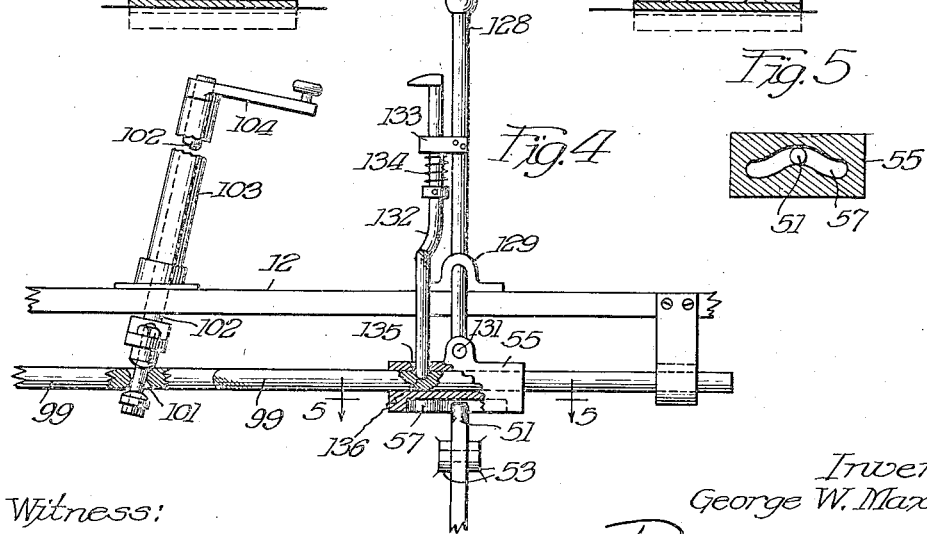
Witness:
Leonard W. Novander.
Inventor
George W. Maxwell
By Poudel Wilson
Attys G. W. MAXWELL.
TRACTOR.
APPLICATION FILED JAN. 7, 1918.
1,294,819.
Patented Feb. 18, 1919.
6 SHEETS—SHEET 4.
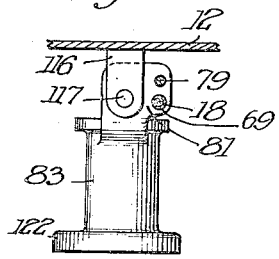
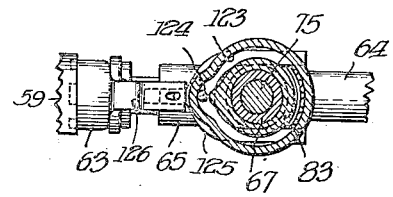
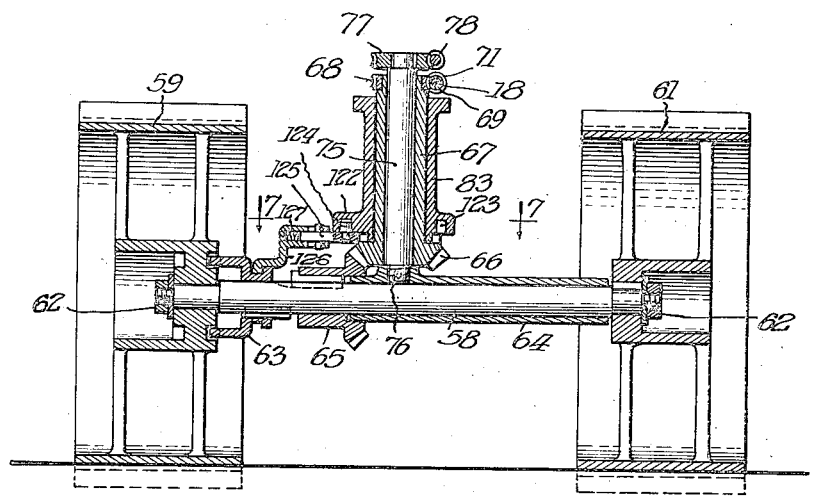
Witness:
Leonard W. Novander
Inventor
George W. Maxwell
By Pondel Wilson Attys

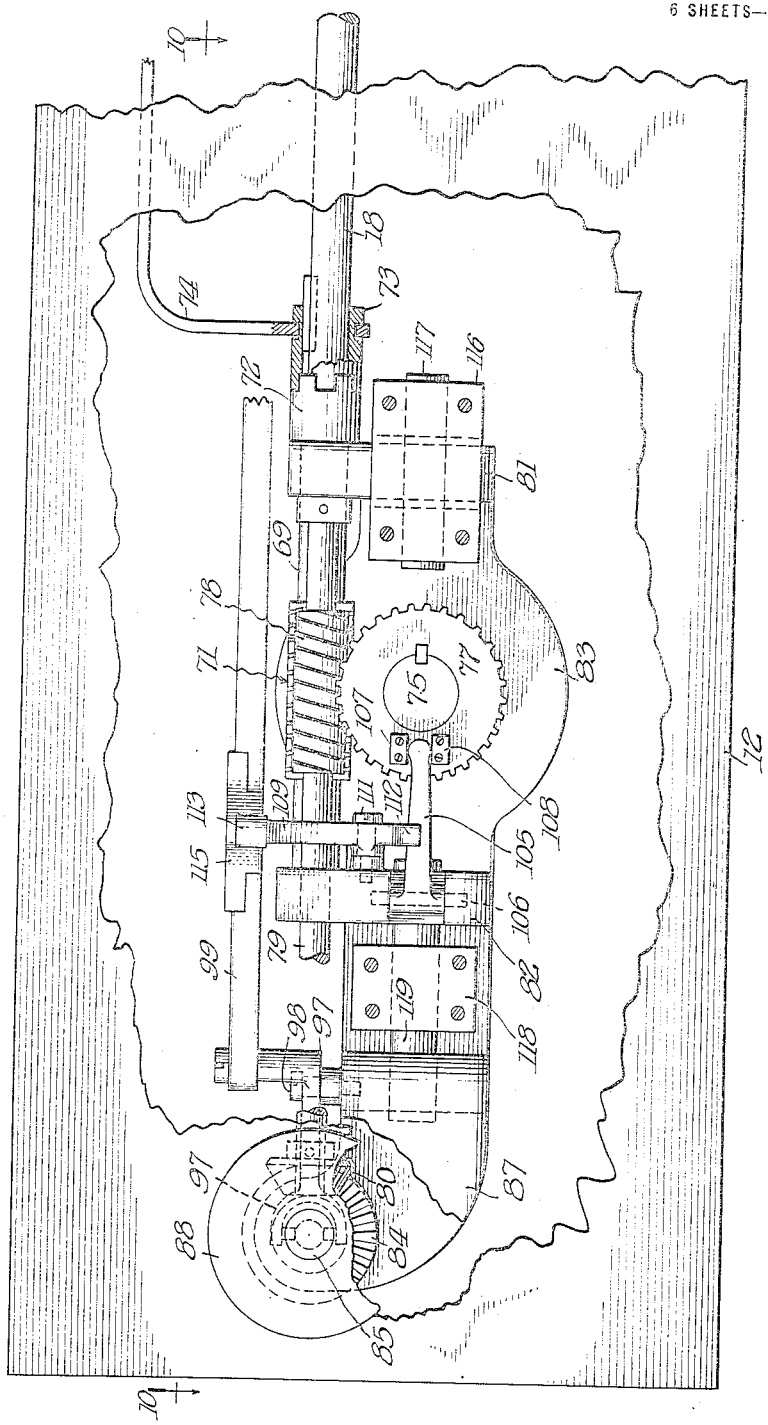

G. W. MAXWELL.
TRACTOR.
APPLICATION FILED JAN. 7, 1918.
1,294,819.
Patented Feb. 18, 1919.
6 SHEETS—SHEET 6.
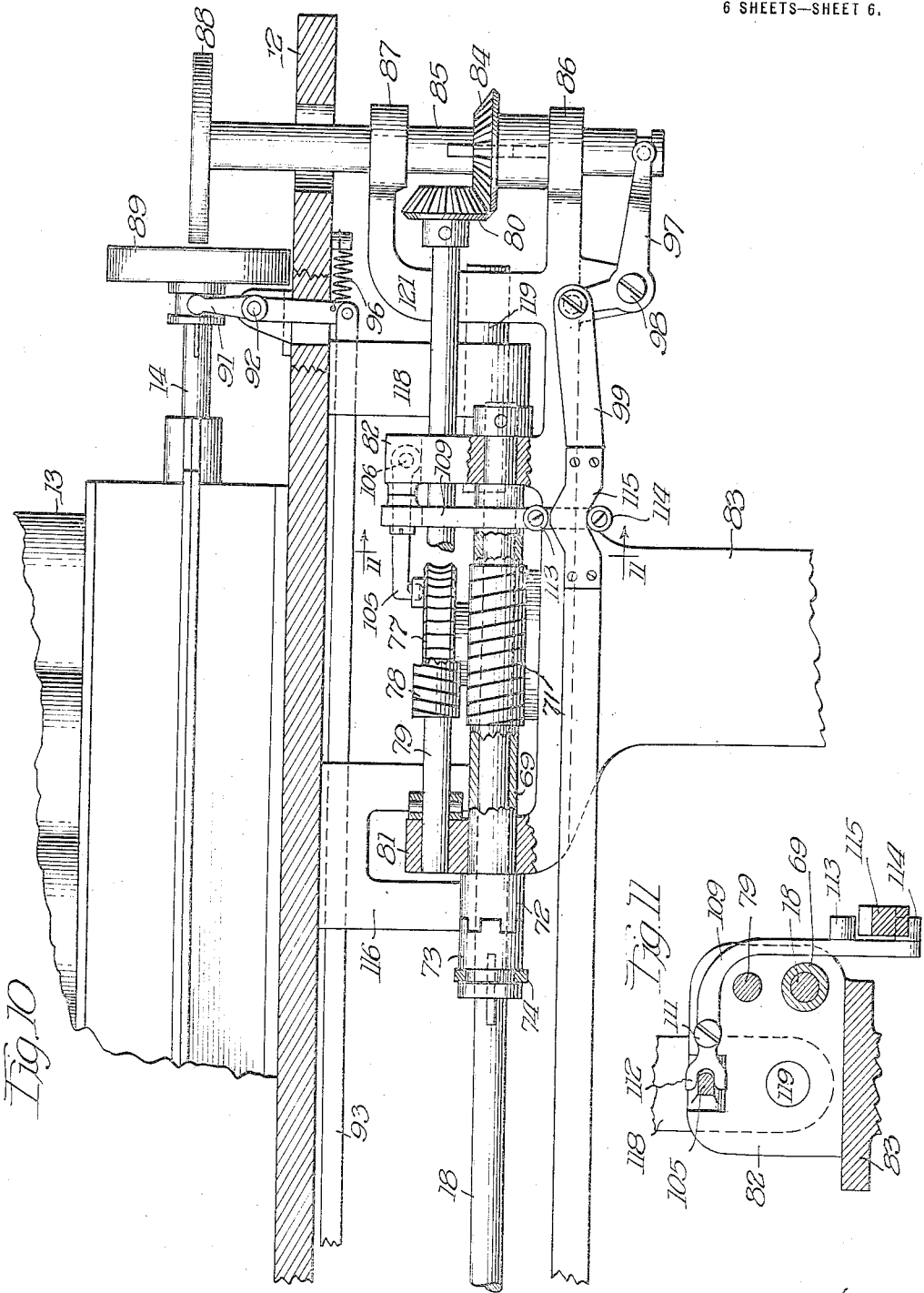
Witness:
Leonard W. Novander
Inventor
George W. Maxwell
By Pondell Wilson
Attys

UNITED STATES PATENT OFFICE.

GEORGE W. MAXWELL, OF CHICAGO, ILLINOIS.

TRACTOR.

1,294,819.      Specification of Letters Patent.      Patented Feb. 18, 1919.

Application filed January 7, 1918. Serial No. 210,597.

*To all whom it may concern:*

Be it known that I, GEORGE W. MAXWELL, a citizen of the United States, residing at Chicago, in the county of Cook and State of Illinois, have invented certain new and useful Improvements in Tractors, of which the following is a specification.

This invention relates in general to tractors, preferably of the internal combustion type, and has more particular reference to tractors adapted for agricultural work and for other purposes where high tractive effort from a small machine is desirable.

One of the primary objects of my present invention is the provision of a tractor which will have great tractive power in proportion to its size and weight, this result being secured by using all four wheels of the tractor as traction wheels.

Another object of my invention resides in novel steering mechanism whereby the power of the engine is utilized for steering purposes, so that the driver may easily and readily steer the tractor by simply manipulating a controlling device, which throws the power-steering mechanism into operation to cause the desired turning movements without any exertion by the driver.

A further feature of my invention resides in the provision of mechanism whereby three of the four traction wheels are automatically disconnected from the source of power when the front wheels have been angled a predetermined amount in turning, thus enabling the actual turning movement to be accomplished by one of the traction wheels only when desirable, the mechanism being so constructed that the driver may by a simple manual operation re-connect two of the disconnected traction wheels with the source of power, so that three wheels are then utilized in the turning movement.

Another advantageous feature of my invention is found in its ability to turn in a very short radius, which is substantially equal to the length of the machine, this ability to turn shortly being the result of the peculiar and novel manner in which the front wheels are mounted and connected with the frame structure.

A further feature of my invention resides in the manner of mounting or connecting the front wheels with the frame structure so that these wheels are capable of independent relative vertical movement, which permits them to travel readily over elevations and depressions in the ground without decreasing their individual tractive efforts.

Still another novel and advantageous feature of my invention is found in the construction of the traction wheels and their connection with the frame and source of power, in such a manner that any desired one or more of them may be removed and reversed with the result that its tread is thereby brought closer to or spaced farther from the frame of the machine. The tread of the tractor as a whole may, consequently, be widened or narrowed, or the rear wheels may be made to track or follow the front wheels in their narrow or wide tread position, or may be made to travel inside or outside the paths of the front wheels, as desired.

Still another object of my invention is the provision of mechanism whereby the front or steering wheels are automatically locked in parallel relation with the rear wheels, so that the tractor will travel straight ahead whenever the front wheels are brought to this position, this locking mechanism, however, being automatically released just prior to the inauguration of their turning movements which cause a change in the direction of travel.

Other objects and many of the attendant advantages of this invention should be readily appreciated by those skilled in the art as the invention becomes better understood by reference to the following description, when considered in connection with the accompanying drawings. Referring to the drawings,—

Figure 1 is a plan view of a tractor embodying my invention;

Fig. 2 is a side elevation thereof, certain portions being removed to more clearly illustrate the parts disposed behind them;

Fig. 3 is a vertical sectional view on the line 3—3 of Fig. 2;

Fig. 4 is a fragmentary detail elevation, looking in the direction of line 4—4 of Fig. 3;

Fig. 5 is a sectional view on the line 5—5 of Fig. 4;

Fig. 6 is a vertical sectional view on the line 6—6 of Fig. 2;

Fig. 7 is a transverse sectional view on the line 7—7 of Fig. 6;

Fig. 8 is a detail elevation of the front supporting column;

Fig. 9 is a fragmentary plan view of a portion of the front wheel driving and steering mechanism;

Fig. 10 is a sectional view on the line 10—10 of Fig. 9; and

Fig. 11 is a detail sectional view on the line 11—11 of Fig. 10.

By reference to the drawings, it will be observed that reference character 12 indicates generally the frame structure of the tractor upon which the various mechanisms are mounted. The motor 13 may be of any preferred type, a four-cylinder gas engine being shown in this instance merely for purposes of illustration. Power is transmitted from the power-shaft 14 of the motor through the clutch 15, which is controlled by the clutch-pedal 16, in the usual manner, into the transmission case 17 which is equipped, as usual, with speed-changing gears by means of which the shaft 18 is driven from the motor at any desired speed. The various speeds are obtained by manipulation of the gear-shifting lever 19 in a manner well understood by those skilled in the art, and since my invention is not dependent upon any particular transmission and speed-changing mechanism a detailed explanation thereof will not be necessary for an understanding of my present invention.

The power-shaft 18, as will be apparent from Fig. 2, extends longitudinally of the machine substantially centrally thereof, and is supported at a plurality of points in suitable bearings carried by the main frame 12. This shaft is equipped at its rear end with a belt pulley 21, by means of which power may be transmitted to any other machine when it is desirable to utilize the tractor as a stationary source of power, and near its rear end the shaft is equipped with a worm 22 meshing with a worm wheel 23 fixed to a drum 24 which is mounted in suitable bearings in the frame, so that this drum, when provided with a cable, may be employed for hoisting or pulling purposes when desired.

The rear end of the tractor frame is carried by the rear traction wheels 24 and 25, which are rotatably mounted upon the outer ends of the transversely extending rear axle 26. It will be observed from Fig. 3 that the hub portions 27 of the rear wheels 24 and 25, through which the ends of the axle 26 project, are disposed nearer to one side of the wheels than to the other, and that the wheels are held on the axle by nuts 28 threaded upon the ends of the axle. If desired the wheels may be removed and reversed upon the axle so that the outer edges will then become inner edges, thus materially reducing the over-all width of the tread of these wheels. In actual practice the over-all width of the tread of the wheels when positioned as shown in Fig. 3 will be about 42 inches, and when the wheels are reversed this width will be reduced to about 28 inches.

The axle 26 has fixedly secured thereto between its ends a worm wheel 29 through which the shaft is driven, this wheel being surrounded and protected by a casing 31 extended laterally to provide the axle housing 32 and 33 and secured to the main frame by a yoke or frame 34. The shaft 18 extends through this housing above the worm wheel 29, and upon the shaft there is mounted a sleeve 35 equipped with a worm 36 which meshes with and drives the worm wheel 29. The sleeve 35 is provided outside the housing with one member 37 of a clutch, the other member 38 of which is splined to the shaft 18, the clutch being adapted to be thrown into and out of engagement by a hand-operated lever 39. It will thus be seen that when the worm 36 is clutched to the shaft 18 the rear axle 26 will be driven from the motor, the direction of rotation and the speed being determined by the position of the gears in the transmission case 17.

Referring again to Fig. 3, it will be noted that clutch members 41 and 42 are splined upon the rear axle 26 in proximity to the wheel hubs 21 and that these hubs are provided on each face with depressions 43 complementary to the clutch members 41 and 42, so as to afford a driving connection through the clutch members between the rear axle and the wheels. The outside faces of the wheel hubs are likewise provided with similar clutch depressions, so that the same driving connection will be established when the wheels are reversed on the axle in the manner previously explained. The clutch members 41 and 42 are provided with peripheral grooves 44 and 45 in which are engaged the forked downwardly projecting ends of longitudinally movable members 46 and 47 respectively, which are guided in their longitudinal movements in the bosses or guideways 48 and 49 carried by the axle housing 32 and 33. The members 46 and 47 are moved longitudinally to engage or disengage their respective clutches by means of levers 51 and 52 pivoted in ears 53 and 54 carried by the casing 31, and these levers are positively actuated by means of slide blocks 55 and 56 (Figs. 3, 4 and 5) provided upon their lower faces with cam slots 57, into which the upper ends of the levers 51 and 52 project. The mechanism by which these blocks are moved forwardly or backwardly to connect or disconnect the wheel clutch members 41 and 42 will be later explained.

The weight of the front end of the machine frame is carried by the front axle 58 which in turn is supported by the front wheels 59 and 61. The wheel 61 is non-rotatably keyed to one end of the axle 58 and is maintained in engagement therewith by a nut 62, while the wheel 59 is rotatably mounted upon the other end of the axle, and driving connection with the axle is established through the clutch member 63 splined to the shaft 58 and similar in structure and operation to the rear clutch members 41 and 42. Both wheels 59 and 61 are capable of being removed and reversed with respect to the axle similarly to the rear wheels 24 and 25 for the purpose of decreasing the over-all width of the tread of these wheels. The axle 58 rotates within a housing 64 and is driven by means of a bevel gear 65 keyed to the axle and a companion driving bevel gear 66 integral with or secured to a vertically disposed driving sleeve 67 provided at its upper end with a worm wheel 68.

Referring now to Figs. 2 and 10, it will be observed that the forward end of the shaft 18 has rotatably mounted thereon a sleeve 69 similar to the sleeve 35 and is also provided with a worm 71 (Figs. 2 and 6) meshing with and adapted to drive the worm wheel 68 and thereby the axle 58. The sleeve 69 is equipped at its rear end with a clutch member 72 adapted to be engaged and driven by a companion clutch member 73 splined on the shaft 18 and connected with the clutch member 38 of the rear clutch by means of a link 74, so that the two clutches are engaged and disengaged simultaneously upon manipulation of the clutch lever 39. When the clutches are engaged power may be transmitted to both the front and rear axles to drive the same, and when the clutches are disengaged the shaft 18 will rotate freely, so that the apparatus may be used as a stationary power plant to transmit power to any desired source through the pulley 21.

In order to change the direction of travel of the tractor when in operation, the housing 64 carrying with it the axle 58 is designed to swing horizontally about a vertical axis passing through the center of the axle. From Fig. 6 it will be observed that a staff or vertical shaft 75 is rigidly pinned at 76 to the housing 64, and is equipped at its upper end with a worm wheel 77 meshing with and adapted to be actuated by a worm 78 fixed upon a short longitudinally extending shaft 79. This shaft is mounted in suitable bearings in upward extensions 81 and 82 of the supporting column 83 which carries the weight of the forward end of the machine. At its forward end the shaft 79 is provided with a bevel gear 80 meshing with a companion bevel gear 84 splined upon a vertical shaft 85 which is mounted to rotate and longitudinally reciprocate in bracket bearings 86 and 87 projecting forwardly from the top of the column 83. The shaft 85 is rotated by a friction disk 88 fixed to the upper end of the shaft and adapted to be engaged by a driving friction disk 89 splined upon the forward end of the motor shaft 14.

This driving disk 89 is moved longitudinally of the motor shaft 14 into engagement with the disk 88 by means of a forked lever 91 embracing the hub of the disk 89, and pivoted at 92 upon the main frame, the lower end of the lever being connected by link 93 with a pedal mounted in accessible position to a driver seated upon the seat 95. A spring 96 normally holds the disk 89 out of engagement with the disk 88, but when it is desired to angle the front axle 58 for steering purposes by the power of the motor, the pedal 94 is moved forwardly, thus moving the face of the disk 89 into engagement with the edge of the disk 88 so as to rotate the shaft 85 and thereby, through the gear and worm connections previously described, turn the shaft 75 so as to angle the front axle the desired amount and in the desired direction.

In order that the direction of rotation of the shaft 85 may be reversed to angle the axle 58 in one direction or the other as may be desired, I have provided mechanism for moving the shaft 85 upwardly or downwardly in its bearings so as to dispose the disk 88 above or below the axis of rotation of the disk 89. It will be understood, of course, that the speed of the shaft 85 and, consequently, the angling speed of the front axle will be determined by the radial distance from the axis of the disk 89, at which engagement is effected between the disks 88 and 89.

The vertical movements of the shaft 85 are imparted to it by means of a bell crank lever 97 pivoted at 98 upon a downward extension from the bearing arm 86, the other arm of the lever being connected by a link 99 with a crank pin 101 (Fig. 4) carried by and radially spaced from a post 102 projecting upwardly through the frame 12 within a guide member 103 and carrying at its upper end an operating device which may be in the form of a wheel or a lever 104, as shown in the drawings. By moving the lever 104 in one direction or the other so as to impart a partial rotation to the post 102, the link 99 will be moved longitudinally to thereby impart the desired vertical movement to the shaft 85. In actual operation, when it is desired to turn the tractor, the lever 104 is first moved in the proper direction to dispose the disk 88 the requisite amount either above or below the axis of the disk 89, whereupon the pedal 94 is actuated to force the disk 89 into engagement with the disk 88. By this simple operation the power from the motor is utilized to angle the front axle in the desired direction and with the desired degree of rapidity. This angling movement can be stopped at any time by simply releasing the disk pedal 94, and the direction of angling may be reversed by turning the lever 104 in the opposite direction so as to move the disk 88 to the opposite side of the axis of the disk 89.

Normally the front axle is maintained in parallelism with the rear axle so that the tractor will travel in a straight line, by means of a locking member 105 (Figs. 9 and 10) pivoted at 106 to the bearing extension 82 and provided at its free end with a downturned portion engaging in a depression in the upper face of the worm wheel 77 or between two blocks 107 and 108 secured to the upper face of this worm wheel. In order to release this latch so that the worm wheel may be turned to angle the axle, I have provided a lever 109 pivoted at 111 and having its horizontal arm forked as indicated at 112 to straddle the latch 105, its other arm being downturned as shown in Figs. 10 and 11 and provided with a pair of spaced rollers 113 and 114 engaging the opposite sides of a cam-shaped member 115 carried by the link 99 when the parts are in neutral position. As shown in Fig. 10 the latch 105 prevents turning movement of the worm wheel 77, but when the link 99 is moved longitudinally in either direction by manipulation of the lever 104 the lever 109 is actuated to raise the latch 105 from its operative position, thereby permitting the worm wheel 77 to turn as soon as the disks 88 and 89 are engaged.

Referring now to Figs. 6 to 10 inclusive, it will be observed that the column 83 surrounding the sleeve 67 is supported at its lower end upon the annular hub of the bevel gear 66 and the weight of the front end of the tractor is carried by this column. The upward projections 81 and 82 of the column, in which the shafts 18 and 79 are journaled, are pivotally connected to the frame 12 of the machine so that a lateral tilting movement about a horizontal axis extending longitudinally of the machine is permitted. The frame 12 is provided with a bifurcated depending member 116 pivotally connected to the upward projection 81 by a hinge pin 117, and another depending member 118 is pivotally connected with the upward projection 82 by a hinge pin 119 disposed in axial alinement with the pin 117 and also projecting forwardly into a bearing formed in the bracket portion 121 in which the shaft 85 is mounted. It will thus be manifest that a relative rocking movement between the frame and the supporting column 83 is provided for which permits the front wheels to rise and fall relatively to each other in traveling over elevations or depressions, when the machine is in use. This construction insures that both front wheels will always be engaged with the ground so as to secure the maximum tractive effort.

The vertical movement of the shaft 18 about the pivot 117 is under ordinary conditions relatively slight amounting only to three-eighths (3/8) of an inch to a vertical displacement of nine (9) inches of one of the wheels, and this slight movement will ordinarily not interfere with the operation of the shaft. A universal joint (not shown) may be interposed in the shaft if found desirable.

It will be evident from the construction thus far described, that all four wheels are normally employed as driving or tractive wheels, and that they are all driven from a common source of power by a positive worm drive mechanism without the employment of any differential either between the two front wheels or the two rear wheels. In order that undue strains may not be imposed upon the driving mechanism or the wheels in turning the tractor sharply in one direction or the other, I have provided mechanism for automatically unclutching three of the wheels from the driving mechanism when the front axle is angled a predetermined amount, thus leaving one only of the front wheels in driving engagement with the motor, so that this wheel serves as the power or traction wheel in the turning movement.

Referring now to Figs. 6 and 7, it will be observed that the base 122 of the column 83 is provided on its lower face with a cam-groove 123, in which is disposed an anti-friction roller 124 carried by a link 125 having a lost motion connection with the clutch-actuating member 126. A coiled expansion spring 127 disposed between the outer end of the member 125 and a socket formed in the clutch-actuating member 126 serves as a safety device to prevent breakage in case the front axle is returned to the normal position shown in Figs. 6 and 7, when the projecting portions of the clutch members 63 and the hub of the wheel 59 are not in exact alinement. It will be observed from Fig. 7 that the cam groove 123 is so shaped that when the front axle is positioned for straight-ahead movement of the tractor the wheel 59 will be clutched to the axle. When, however, the axle is angled in either direction a predetermined amount the clutch member 63 will be withdrawn from engagement with the wheel hub, thereby disconnecting the wheel 59 and permitting all of the power delivered to the front axle to be transmitted to the wheel 61, which is fixedly secured to the axle so that this wheel serves as a tractive wheel during the turning movements.

The two rear wheels 24 and 25 are also disconnected from the rear axle 26 by disengagement of the clutch members 41 and 42 when turning movement is desired. It has previously been explained how these clutches are disengaged upon longitudinal movements of the cam blocks 55 and 56. Referring now to Figs. 1, 3 and 4, it will be observed that these blocks are disposed upon the forked rearward extensions 99 of the bar, which is moved longitudinally to raise or lower the disk 88 upon manipulation of the lever 104. A hand-operated lever 128 is fulcrumed in two ears 129 upon the main frame. The lower bifurcated ends of this lever are pivotally connected at 131 with bearings carried by the blocks 55 and 56 respectively. A slidable latch member 132 is guided in a bracket 133 carried by the lever 128 and is normally depressed by an expansion spring 134 so that its bifurcated lower ends project through openings 135 in the tops of the blocks 55 and 56 into depressions 136 formed in the rearwardly projecting ends of the rod 99. It will thus be seen that when the rod 99 is moved longitudinally in either direction by the lever 104 the blocks 55 and 56 will be carried longitudinally with the rod, thereby actuating the levers 51 and 52 to withdraw the clutch members, 41 and 42 respectively, from engagement with the hubs of the rear traction wheels. The turning movement of the tractor will now be effected solely by the front driving wheel 61, and it will be manifest that practically a right angle turn may be made in either direction, since the front wheels are small enough to turn wholly under the tractor body. In the event that it should be necessary or desirable to augment the tractive effort of the front wheel 61 during the turning movements by the tractive effort of the rear wheels these rear wheels may be thrown into operation by disconnecting the blocks 55 and 56 from the rod 99, which result is accomplished by simply pulling upwardly on the latch 132. Thereupon the lever 128 may be moved so as to restore the blocks 55 and 56 to normal position, as shown in Fig. 5, which operation reëngages the clutch members 41 and 42 with their respective rear wheels.
All of the traction wheels are equipped with grips 137 which are preferably in the form of angle bars, one angle of which is greater than the other and both angles being provided with apertures through which bolts may be passed to clamp the grips onto the peripheries of the wheels. The longer sides of the grips may be secured to the wheels as shown in Fig. 2 or, if it is desirable that the grips be of greater radial length, the shorter sides of the grips may be bolted to the wheels, leaving the longer edges projecting radially so as to more effectively engage with the ground and result in greater tractive effort. In the drawings the wheels are all shown as positioned in wide tread position, but in Fig. 1 I have indicated in dotted lines the position that the wheels will assume when reversed into narrow tread position as previously explained.

It is believed that my invention and many of its attendant advantages will be readily appreciated from the foregoing without further description, and it should be manifest that I have provided a four-wheel-drive tractor which can be turned shortly in either direction, the turning movements being accomplished by power directly from the motor, and that while turning three of the driving wheels are automatically disconnected so that the turning movement is effected by one of the front drive wheels only, and that if further power is required to accomplish the turning movements the rear wheels may be manually reconnected to the source of power. In any event the three disconnected wheels will be automatically reconnected when the front wheels are again brought into parallel relation with the rear wheels for straight-ahead travel.

While I have shown and described one preferred embodiment of my invention it should be understood that various changes in the size, shape, proportion and arrangement of the various parts may be resorted to without departing from the essence of the invention as defined in the following claims.

I claim:

1. In a tractor the combination of front and rear driving axles, a pair of traction wheels mounted upon each of said axles, one pair of said wheels being permanently and non-rotatably connected with its axle and the remaining wheels being clutched to the axles, and means for unclutching said remaining wheels from their axles so as to permit said one wheel to serve as the sole traction wheel of the machine.

2. In a tractor the combination of front and rear driving axles, traction wheels mounted on said axles, one of said front wheels being non-rotatably attached to its axle, means for connecting or disconnecting the remaining traction wheels with their respective axles, and mechanism for automatically actuating said means for disconnecting said wheels, when the direction of travel of the tractor is changed a predetermined amount.

3. In a tractor the combination of front and rear driving axles, means including a power shaft and worm driving connections with each of said axles for driving the same, a pair of traction wheels mounted upon each of said axles, and means for automatically disconnecting three of said wheels from their respective axles upon a predetermined change in directional position of said front wheels.

4. In a tractor the combination of a pair of driving axles, traction wheels mounted thereon, means including a power shaft for driving said axles, means for automatically disconnecting one of the front wheels and both of the rear wheels from their respective axles upon predetermined angling of the front wheels, and means whereby said rear wheels may be connected to or disconnected from said rear axle at will.

5. In a tractor the combination of a front and a rear driving axle, a pair of traction wheels mounted on said rear axle, clutch mechanisms for establishing a driving connection between said axle and each of said wheels, manual means for engaging and disengaging said clutches, manually controlled steering mechanism, and connections between said steering mechanism and said clutches whereby the clutches are automatically thrown out at each predetermined actuation of said steering mechanism.

6. In a tractor the combination of a front axle mounted to turn about a vertical medial axis, a traction wheel non-rotatably mounted upon one end of the axle, a second traction wheel rotatably mounted upon the other end of the axle, a clutch for establishing a driving connection between said axle and said second wheel, means for driving said axle, means for angling said axle about said vertical axis, and means for disengaging said clutch upon a predetermined angling movement of said axle.

7. In a tractor the combination of a front driving axle mounted to swing about a vertical axis for steering purposes, a rear driving axle, a pair of traction wheels mounted upon each of said axles, power operated means for simultaneously driving both of said axles, power operated means for swinging said front axle about said vertical axis, mechanism for normally locking said front axle against swinging movement, means for releasing said locking mechanism and simultaneously unclutching said rear wheels from said rear axle, means for throwing said power actuated axle swinging means into operation, and means for unclutching one of said front wheels from said shaft when said axle has been swung about its axis a predetermined amount.

8. In a tractor the combination of a tractor frame, a supporting column for the front end thereof pivotally connected at its upper end to said frame, a driving axle supporting said column, power operated mechanism partially disposed within said column for driving said axle, power operated means partially disposed within said column for swinging said axle in a horizontal plane, a traction wheel clutched to said axle, and means adapted to be operated from said column for unclutching said traction wheel when said axle has been swung a predetermined amount.

GEORGE W. MAXWELL.